US012798474B2

(12) United States Patent
Theodosakis et al.

(10) Patent No.: US 12,798,474 B2
(45) Date of Patent: Nov. 17, 2026

(54) AUTOMATIC TURN SIGNAL OPERATION FOR A VEHICLE

(71) Applicant: Textron Inc., Providence, RI (US)

(72) Inventors: Gregory August Theodosakis, Martinez, GA (US); Russell William King, Evans, GA (US); Lindsey Marie Connelley, North Augusta, SC (US)

(73) Assignee: TEXTRON INNOVATIONS INC., Providence, RI (US)

( * ) Notice: Subject to any disclaimer, the term of this patent is extended or adjusted under 35 U.S.C. 154(b) by 358 days.

(21) Appl. No.: 18/424,055

(22) Filed: Jan. 26, 2024

(65) Prior Publication Data

US 2025/0242749 A1 Jul. 31, 2025

(51) Int. Cl.
*B60Q 1/34* (2006.01)
*A63B 55/60* (2015.01)

(52) U.S. Cl.
CPC ................ *B60Q 1/34* (2013.01); *A63B 55/60* (2015.10)

(58) Field of Classification Search
CPC ....... B60Q 1/34; A63B 55/60; A63B 24/0062; A63B 60/54; A63B 71/0622; A63B 55/61; A63B 24/0003; A63B 24/00; A63B 24/0006; A63B 71/0669; A63B 2071/0625; A63B 2220/12; A63B 2220/20; A63B 2220/806; A63B 2225/50; A63B 71/0619; A63B 71/00; A63B 71/06; A63B 2071/0647; A63B 2071/065; A63B 2071/0655; A63B 2071/0658; A63B 2024/0025; A63B 2024/0046; A63B 2055/615; A63B 69/36; A63B 69/00; A63B 69/3605; A63B 69/3608; A63B 69/3614; A63B 69/3617; A63B 69/3621; A63B 69/3623; A63B 69/3658; A63B 69/3661; A63B 69/3667; A63B 69/3676; A63B 69/3691; A63B 2055/402; A63B 2069/3605; A63B 2071/0691; A63B 2220/16; A63B 2220/40; A63B 2225/54; G06N 20/00; G05D 1/247; G05D 1/622;

(Continued)

(56) References Cited

U.S. PATENT DOCUMENTS 4,213,116 A 7/1980 Holtzman et al.
4,638,295 A 1/1987 Middlebrook et al.

(Continued)

FOREIGN PATENT DOCUMENTS

RU 2806748 C1 * 11/2023
WO WO-2019239402 A1 * 12/2019 ............. G06V 20/58

*Primary Examiner* — Brian A Zimmerman
*Assistant Examiner* — Anthony D Afrifa-Kyei
(74) *Attorney, Agent, or Firm* — Foley & Lardner LLP

(57) ABSTRACT

A golf cart includes a turn signal, a sensor, and a controller. The turn signal is configured to indicate a turning state of the golf cart. The turn signal having an on state and an off state. The sensor is configured to acquire data regarding motion of the golf cart. The controller is configured to acquire the motion data from the sensor, determine whether the golf cart is operating in a turning state based on the motion data, set the turn signal to the on state in response to determining that the golf cart is operating in the turning state, and set the turn signal to the off state in response to determining that the golf cart stops operating in the turning state and is operating in a non-turning state.

20 Claims, 6 Drawing Sheets

(58) Field of Classification Search
CPC ...... G05D 1/686; G05D 2105/60; G05D 1/12; G05D 1/0022; G05D 1/0061; G05D 1/0214; G05D 1/226; G05D 1/81; G05D 1/00; G05D 1/80; G05D 1/815; G05D 1/817; G05D 2101/10; G05D 2107/24; G05D 2109/10; G05D 2201/0204; G05D 1/0011; G05D 1/0016; G05D 1/0027; G05D 1/0033; G05D 1/0038; G05D 1/0044; G05D 1/005; G05D 1/0088; G05D 1/0212; G05D 1/027; G06Q 50/10; G01S 19/19; G01S 5/0045; G01S 17/04; G01S 17/931; G09B 19/0038; G06T 7/593; H04W 4/80; Y02T 10/72; H02J 50/80
See application file for complete search history.

(56) References Cited

U.S. PATENT DOCUMENTS

| | | | |
|---|---|---|---|
| 5,627,756 | A | 5/1997 | Fukada et al. |
| 5,686,662 | A | 11/1997 | Tracht et al. |
| 5,710,704 | A | 1/1998 | Graber |
| 5,712,618 | A | 1/1998 | Mckenna |
| 5,742,925 | A | 4/1998 | Baba |
| 5,964,819 | A | 10/1999 | Naito |
| 6,324,458 | B1 | 11/2001 | Takagi et al. |
| 6,332,353 | B1 | 12/2001 | Gesele et al. |
| 6,363,306 | B1 | 3/2002 | Palmertz et al. |
| 6,438,463 | B1 | 8/2002 | Tobaru et al. |
| 6,889,161 | B2 | 5/2005 | Winner et al. |
| 7,173,524 | B2 | 2/2007 | Ponziani |
| 7,349,778 | B2 | 3/2008 | Shin et al. |
| 7,401,871 | B2 | 7/2008 | Lu et al. |
| 8,073,607 | B2 | 12/2011 | Sidlosky et al. |
| 8,280,591 | B2 | 10/2012 | Serarslan et al. |
| 8,791,637 | B2 | 7/2014 | Shimizu et al. |
| 9,988,059 | B2 | 6/2018 | Satomura |
| 10,577,020 | B2 | 3/2020 | Ikedo et al. |
| 2001/0029438 | A1 | 10/2001 | Tobaru et al. |
| 2002/0024434 | A1 | 2/2002 | Okuda et al. |
| 2004/0002795 | A1 | 1/2004 | Tanimoto et al. |
| 2005/0102085 | A1 | 5/2005 | Sakata |
| 2005/0189161 | A1 | 9/2005 | Zheng et al. |
| 2005/0195073 | A1 | 9/2005 | Subbaraman |
| 2005/0206226 | A1 | 9/2005 | Lu et al. |
| 2006/0074535 | A1 | 4/2006 | Gim et al. |
| 2007/0021896 | A1 | 1/2007 | O'Dea |
| 2007/0118263 | A1 | 5/2007 | Nelson |
| 2007/0173997 | A1 | 7/2007 | Shiozawa et al. |
| 2008/0018446 | A1 | 1/2008 | Miyamoto |
| 2009/0069978 | A1 | 3/2009 | Inage |
| 2009/0205936 | A1 | 8/2009 | Ueno |
| 2010/0023180 | A1 | 1/2010 | Huang et al. |
| 2010/0023182 | A1 | 1/2010 | Huang et al. |
| 2010/0023216 | A1 | 1/2010 | Huang et al. |
| 2010/0023296 | A1 | 1/2010 | Huang et al. |
| 2010/0042294 | A1 | 2/2010 | Lich et al. |
| 2010/0209884 | A1 | 8/2010 | Lin et al. |
| 2010/0209886 | A1 | 8/2010 | Lin et al. |
| 2010/0308988 | A1 | 12/2010 | Ieda et al. |
| 2011/0190985 | A1 | 8/2011 | Billberg et al. |
| 2012/0229268 | A1 | 9/2012 | Butlin et al. |
| 2013/0211619 | A1 | 8/2013 | Kieren et al. |
| 2017/0334349 | A1 | 11/2017 | Nilsson |
| 2018/0178721 | A1 | 6/2018 | Ikedo et al. |
| 2018/0244195 | A1* | 8/2018 | Haight .................. B60Q 1/346 |
| 2021/0300457 | A1* | 9/2021 | Kuribayashi .......... B62D 6/002 |
| 2022/0118903 | A1 | 4/2022 | Cristini et al. |
| 2023/0101567 | A1 | 3/2023 | Brunner |

* cited by examiner

AUTOMATIC TURN SIGNAL OPERATION FOR A VEHICLE

BACKGROUND

Vehicles typically include turn signal indicators that can be manually activated and deactivated by an operator to indicate an intention to turn or move over.

SUMMARY

One embodiment relates to a golf cart. The golf cart includes a turn signal, a sensor, and a controller. The turn signal is configured to indicate a turning state of the golf cart. The turn signal having an on state and an off state. The sensor is configured to acquire data regarding motion of the golf cart. The controller is configured to acquire the motion data from the sensor, determine whether the golf cart is operating in a turning state based on the motion data, set the turn signal to the on state in response to determining that the golf cart is operating in the turning state, and set the turn signal to the off state in response to determining that the golf cart stops operating in the turning state and is operating in a non-turning state.

Another embodiment relates to a vehicle system for a vehicle having a turn signal. The vehicle system includes one or more processing circuits. The one or more processing circuits are configured to receive motion data associated with the vehicle, determine whether the vehicle is operating in a turning state based on the motion data, set the turn signal to an on state in response to determining that the vehicle is operating in the turning state, and set the turn signal to an off state in response to determining that the vehicle stops operating in the turning state and is operating in a non-turning state.

Still another embodiment relates to a method for automatically operating a turn signal of a vehicle. The method includes receiving, by a control system, motion data associated with the vehicle; determining, by the control system, whether the vehicle is operating in a turning state based on the motion data; setting, by the control system, the turn signal to an on state in response to determining that the vehicle is operating in the turning state; and setting, by the control system, the turn signal to an off state in response to determining that the vehicle stops operating in the turning state and is operating in a non-turning state.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
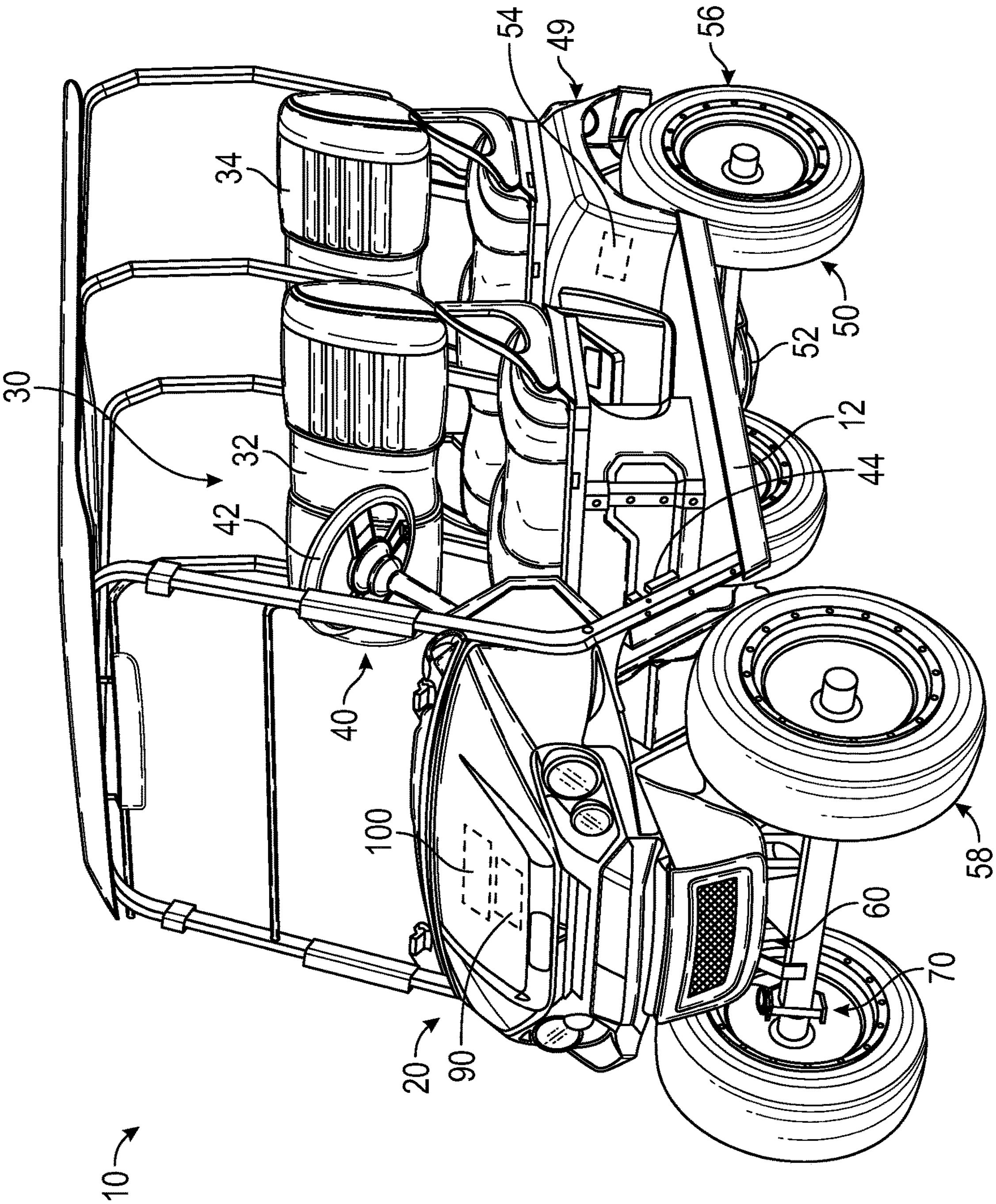
FIG. 1 is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes a controller configured to monitor the movement of the vehicle and activate/deactivate turn signals thereof when the vehicle is turning or exiting a turn (e.g., during, after, or in anticipation of entering/leaving a turning state). The systems, methods, and the like disclosed herein provide more accurate and timely activations of turn signals based on operative vehicle data and avoid relying on manual activation of turn signals. The vehicle systems and methods thus avoid the risk of operators failing to signal or signaling at improper times. Accordingly, the vehicle and systems of the present disclosure provide consistent and convenient activation of vehicle turn signals that improve operator focus, lower the difficulty of operating the vehicle, and limit turn signal use to operating conditions when signaling a turn is necessary, thereby extending the lifetime of the turn signal (e.g., avoiding extended use after a turn if an operator forgets to deactivate the turn signal) and preventing potentially dangerous operator behavior (e.g., failing to activate a turn signal until mid-way through a turn).

Further, the systems, methods, and the like disclosed herein beneficially provide limited deference to operator use of manual turn signal activation systems, allowing operators to provide advance notice of a turn, utilize the turn signals as hazard/warning lights, or the like even while the systems detect that the vehicle state is inconsistent with the movement of the vehicle (e.g., the system detects the vehicle is not turning however the operator manually activates the turn signal). Additionally, the systems beneficially eliminate the risk of operators inadvertently leaving turn signals on for extended periods of time, which may drain vehicle battery or lower the life span of the turn signal. For example, the vehicle and systems of the present disclosure may detect an inconsistency between a manual turn signal setting and a detected vehicle movement state (e.g., manual turn signal controls have been set to the on state for more than a threshold period of time, etc.), permit the manual state to control for a limited time (e.g., an override time), then override the manual signal (e.g., to turn off the turn signal) after the override time is passed. In this way, turn signals are not left active for extended periods of time while the vehicle is unoccupied, stored, disabled, etc. Additionally, in some embodiments, the systems disclosed herein may detect unintended manual activation of the turn signal and deactivate the turn signal to prevent confusion or incorrect signaling to other drivers. For example, an operator may inadvertently manually set the turn signal to the on state while driving or may inadvertently leave the turn signal in the on state for an extended duration after completing a turn. Accordingly, the driver may drive in a non-turning state for an extended period of time while the turn signal lingers in the on state. Other drivers may be confused or travel in the path of the vehicle based on the unintentional setting of the turn signal to the on state (e.g., a pedestrian/driver may cross in front of the vehicle expecting that the vehicle will turn at a fork in a route, however the vehicle continues traveling forward). Accordingly, the override time may be set to a relatively short period (e.g., 2 minutes, 5 minutes, 10 minutes, etc.). In this way, the systems disclosed herein may override the manual activation of the turn signal and set the turn signal to the off state after the override time has passed to prevent unsafe driving conditions and prevent lingering/unintended turn signal indications, thereby increasing the safety of vehicle operators, bystanders, etc.

Overall Vehicle

Figure 2:
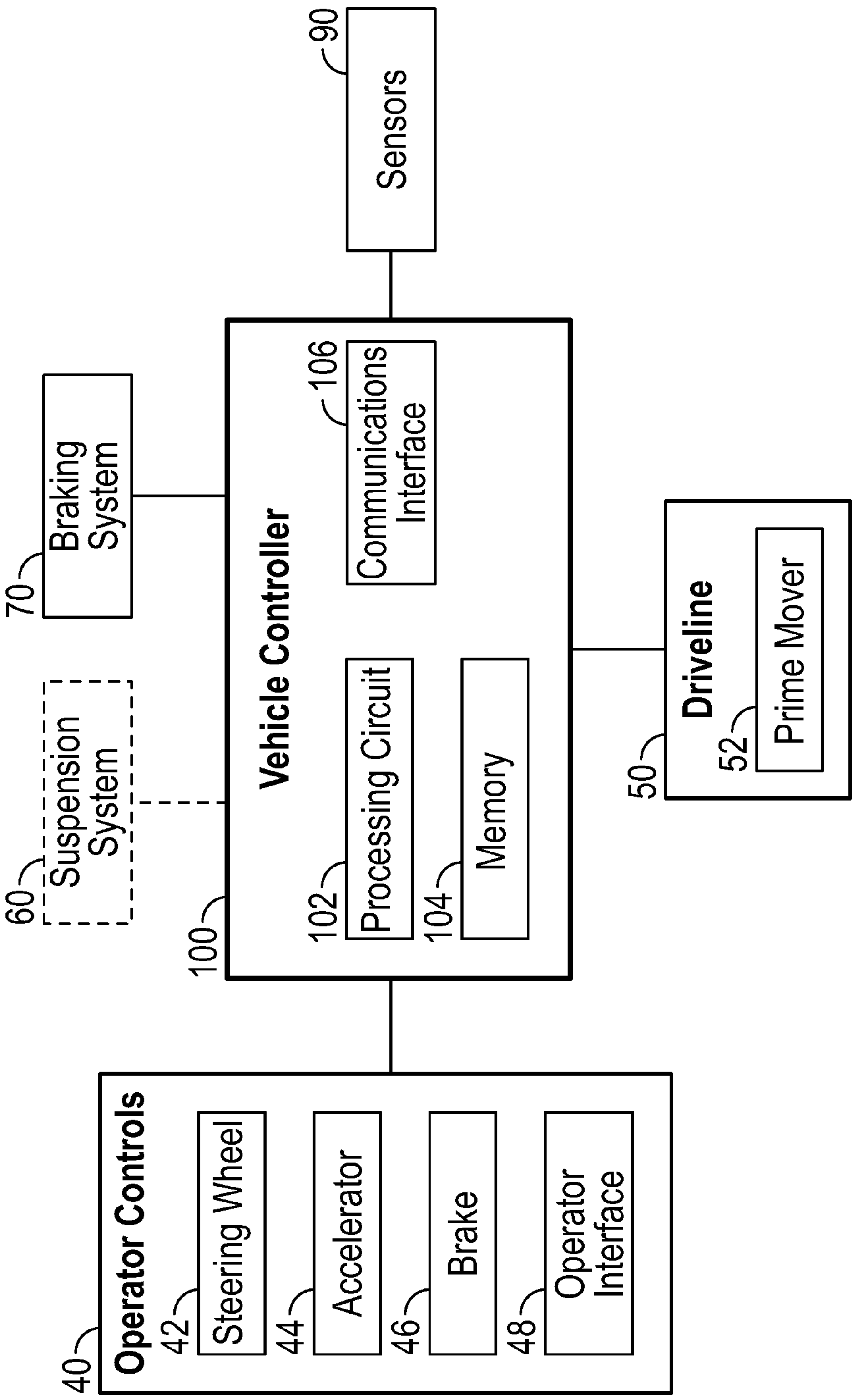
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a vehicle control system, shown as vehicle controller 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, an LCD display, an LED display, a speedometer, gauges, warning lights, etc. The one or more input device may be or include buttons, switches, knobs, levers, dials, etc.

As shown in FIG. 1, the vehicle 10 includes one or more turn indicators, shown as turn signals 49. In some embodiments, an operator may be permitted to activate or deactivate the turn signals 49 via the operator controls 40. As discussed herein, the vehicle 10 may also include one or more systems or processors configured to automatically activate, deactivate, or otherwise manage an operation of the turn signals 49. The turn signals 49 may alternate between (a) an "off state" and (b) an "on state" indicating that the vehicle 10 is turning or intends to turn, will move in a designated direction (e.g., left, right), is crossing onto/off of a path, is changing or intends to change lanes, or the like. The turn signals 49 may include, but are not limited to, flashing lights, audio cues, moving indicators, or other suitable markers to designate that the vehicle 10 is turning or is intending to perform a turning maneuver.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.)

positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements.

The sensors 90 may include various sensors positioned about the vehicle 10 to acquire vehicle information or vehicle data regarding operation of the vehicle 10 and/or the location thereof. By way of example, the sensors 90 may include an accelerometer, a speedometer, an inertial measurement unit ("IMU"), a gyroscope, a compass, a position sensor (e.g., a GPS sensor, etc.), suspension sensor(s), wheel sensors, an audio sensor or microphone, a camera, an optical sensor, a proximity detection sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, acceleration of the vehicle 10, angular velocity of the vehicle 10, forces experienced by the vehicle 10, vibrations experienced by the vehicle 10, sounds proximate the vehicle 10, suspension travel of components of the suspension system 60, and/or other vehicle telemetry data.

The vehicle controller 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle controller 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle controller 100 may represent a collection of processing devices. In such cases, the processing circuit 102 represents the collective processors of the devices, and the memory 104 represents the collective storage devices of the devices.

In one embodiment, the vehicle controller 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle controller 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle controller 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Site Monitoring and Control System

Figure 3:
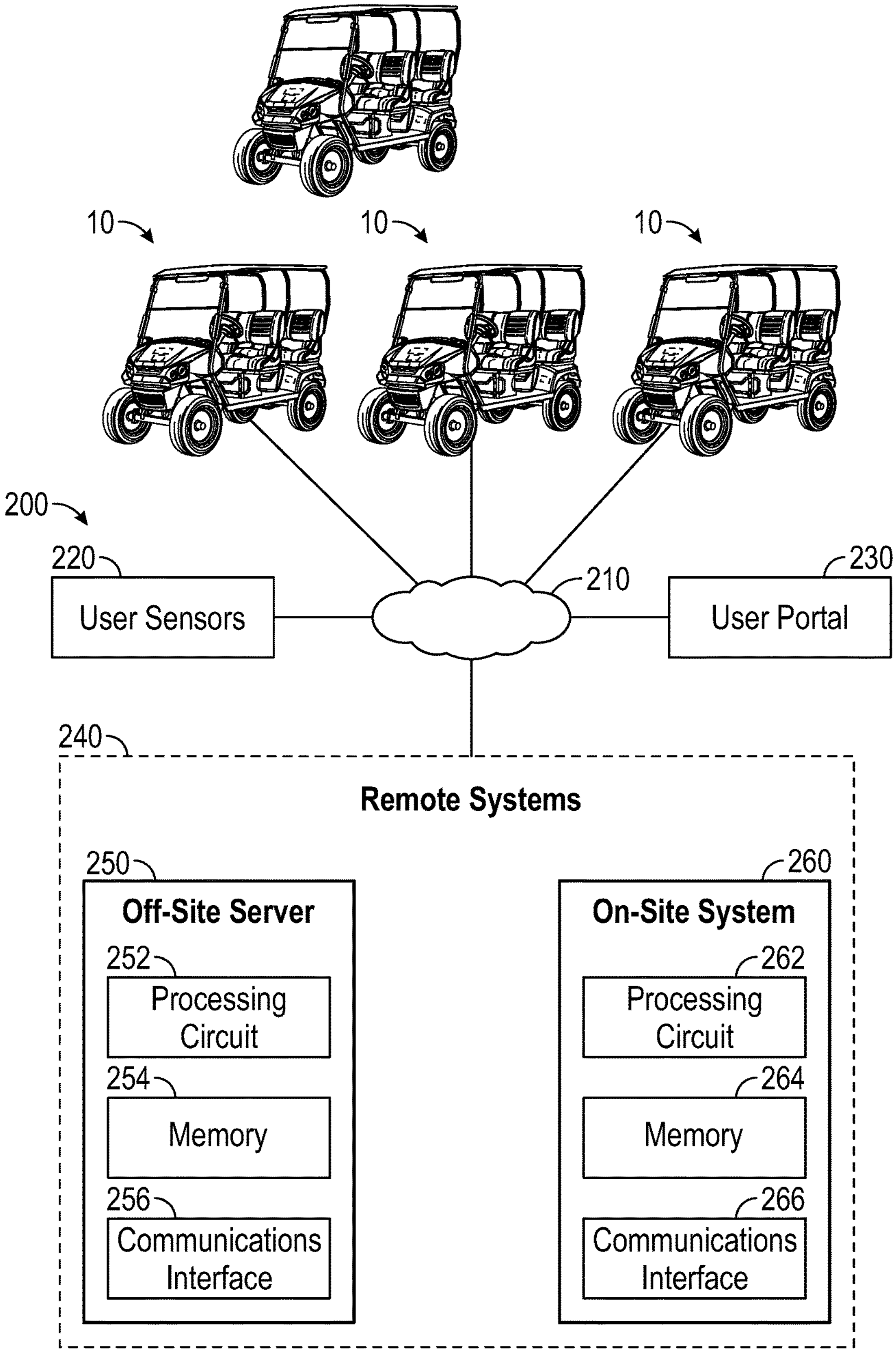
FIG. 3 is a schematic block diagram of a site monitoring and control system including a plurality of the vehicles of FIG. 1, according to an exemplary embodiment.

As shown in FIG. 3, a monitoring and control system, shown as site monitoring and control system 200, includes one or more vehicles 10; one or more second sensors, shown as user sensors 220, positioned remote or separate from the vehicles 10; an operator interface, shown as user portal 230, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, hear rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, information available at the remote systems 240, etc. to manage and operate the site (e.g., golf course) such as for advanced scheduling purposes, to identify persons braking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, tuning vehicle parameters in response to conditions such as rain, sleet, snow, etc.). The user portal 230 may be or may be accessed via a computer, laptop, smartphone, tablet, or the like.

As shown in FIG. 3, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle controllers 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.3

According to an exemplary embodiment, the site monitoring and control system 200, including the vehicle controller 100, the user sensors 220, the user portal 230, and the remote systems 240, is configured to facilitate improving or enhancing location detection of the vehicles 10 and associated control thereof based on location. Further, it should be understood that any of the functions or processes described herein with respect to the site monitoring and control system 200 may be performed by the vehicle controller 100 and/or the remote systems 240. By way of example, data collection may be performed by the vehicle controller 100 and data analytics may be performed by the vehicle controller 100. By way of another example, data collection may be performed by the vehicle controller 100 and data analytics may be performed by the remote systems 240. By way of yet another example, data collection may be performed by the vehicle controller 100, a first portion of data analytics may be performed by the vehicle controller 100, and a second portion of data analytics may be performed by the remote systems 240. By way of still another example, a first portion of data collection may be performed by the vehicle controller 100, a second portion of data collection may be performed by the remote systems 240, and data analytics may be performed by the vehicle controller 100 and/or the remote systems 240.

Automatic Turn Signal Operation

Figure 4:
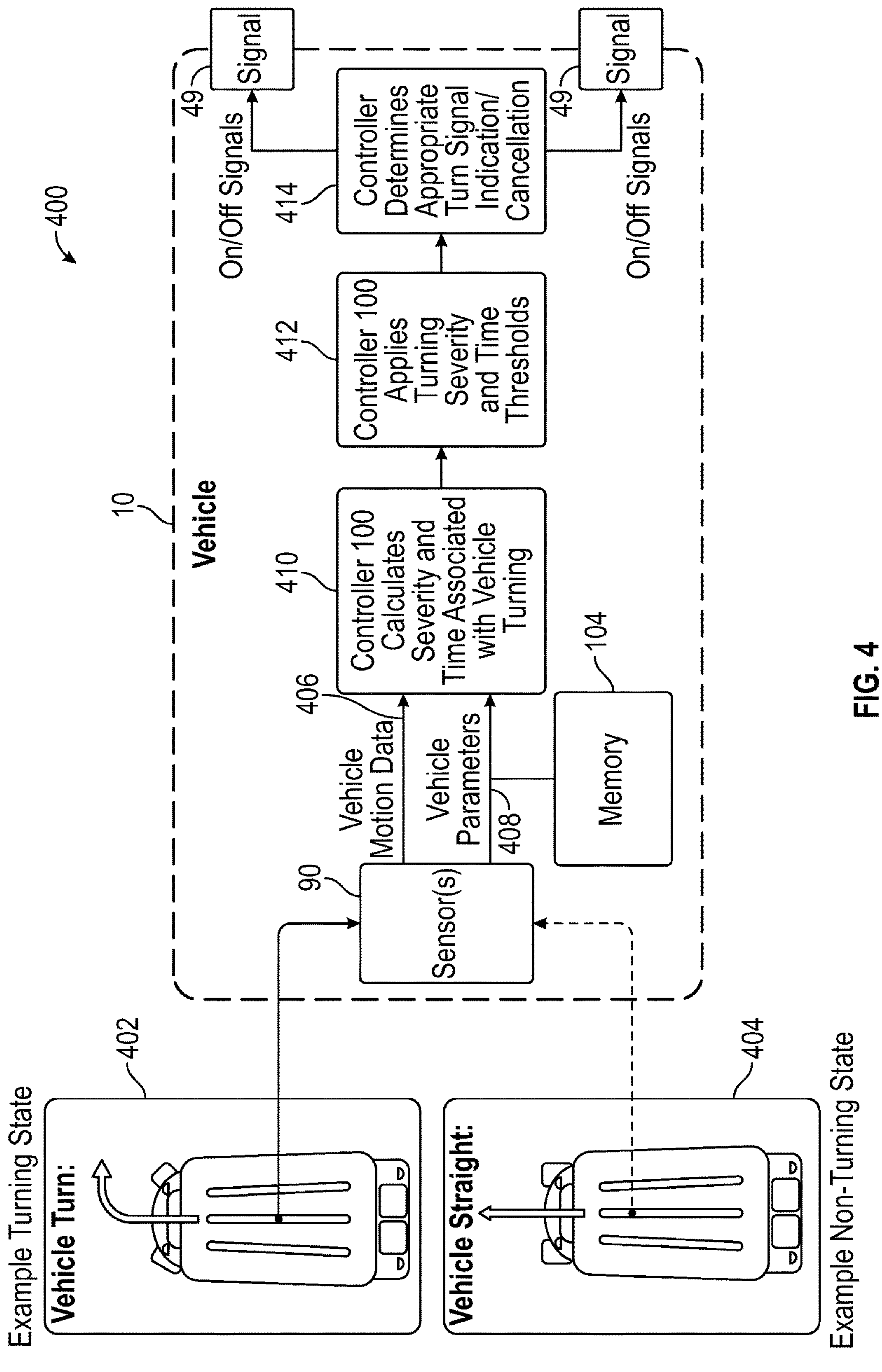
FIG. 4 is a flow diagram illustrating a vehicle system and an illustrative process thereof, according to an exemplary embodiment.

Referring to FIGS. 4-7, the vehicle 10 is equipped with a vehicle system 400 (e.g., a vehicle 10 and controller 100 having a processor and a memory, a controller 100 and one or more processing circuits associated with a vehicle 10, one or more controllers 100 and/or processing circuits located on and/or remote to the vehicle 10, etc.) configured to cause the one or more turn signals 49 of the vehicle 10 to selectively transition between the on state (e.g., indicating a right turn, indicating a left turn, etc.) and the off state (e.g., indicating no motion, indicating an end to a turn, indicating a straight driving route, etc.) without requiring manual user input from a vehicle operator. In this way, the vehicle system 400 may automatically initiate or cancel operation of the turn signals 49 responsive to or in anticipation of the movement of the vehicle 10. Beneficially, the vehicle system 400 detects and activates/deactivates turn signals 49 responsive to the vehicle 10 entering/leaving a turn state and alleviates the operator from having to manually flip a switch, press a button, turn a dial, or the like. As shown in FIG. 4, the vehicle system 400 may monitor a movement of the vehicle 10, receive vehicle parameters, determine whether the motion data and/or vehicle parameters are indicative of a vehicle turning state 402 or a vehicle non-turning state 404, and determine whether to activate and/or deactivate the vehicle turn signals 49 in anticipation of or during the vehicle turning state 402 and/or the vehicle non-turning state 404.

Referring particularly to FIG. 4, and as used herein, a vehicle turning state 402 may include the vehicle 10 traveling at a predefined angular velocity, navigating a route above a minimum speed and/or a minimum turn radius, operating while experiencing translational frictional forces above a force limit (e.g., cornering), operating within a designated range of angular acceleration, operating within a defined range of linear velocities relative to the orthogonal axes of the vehicle 10 for a minimum time threshold, or the like. In this way, the vehicle turning state 402 may include a specific condition or a set of conditions under which the vehicle 10 is executing a turn or is about to initiate a turn. The vehicle turning state 402 may also include movements of the vehicle 10 that indicate a change in the travel direction of the vehicle 10, which prompt the activation of the turn signal 49. Further examples of the vehicle turning state 402 include transitioning from a straight-line path to follow a curved trajectory. Further, the turning state 402 may be defined by a relationship between user inputs via the operator controls 40 (e.g., an acceleration request, steering operations, braking operations, etc.) and a detected pattern and/or change in the orientation and direction of the vehicle 10.

Further, the vehicle non-turning state 404 may include the vehicle 10 traveling below a predefined angular velocity, navigating a route below a minimum speed and/or a minimum turn radius, operating while experiencing translational frictional forces below a force limit, operating below a designated range of angular accelerations, operating below a defined range of linear velocities relative to the orthogonal axes of the vehicle 10 for a minimum time threshold, or the like. Additionally, the vehicle non-turning state 404 may correspond to a state in which the vehicle 10 is exiting or has recently ended the turning state 402. For example, such vehicle non-turning states 404 may include the vehicle 10 returning to a straight path after traveling on a curvilinear path, resuming travel below a predefined turn angle, falling below a minimum speed and/or coming to a stop, making minor horizontal velocity adjustments while maintaining a forward/rearward velocity above a minimum threshold (e.g., making minor course adjustments, following a slight bend in a path, briefly swerving to stay on course/avoid an obstacle, or the like). The vehicle non-turning state 404 may also include movements of the vehicle 10 that indicate a change in the travel direction of the vehicle 10, which prompt the deactivation of the turn signal 49.

One or more of the sensors 90 of the vehicle 10 may acquire data and/or signals indicative of the motion of the vehicle 10. The one or more sensors 90 may include accelerometers, speedometers, gyroscopes, IMUs, GPS devices, rotational speed sensors, or other suitable sensors. The sensors 90 may provide vehicle motion data 406 to the vehicle system 400 (e.g., to the vehicle controller 100). The sensors 90 may also measure, detect, or otherwise provide vehicle parameters 408 to the vehicle system 400. Vehicle parameters 408 may include qualities and/or features of the vehicle 10 that are relevant to determining the behavior of the vehicle 10 while in motion but may be otherwise independent of the movement of the vehicle 10. For example, vehicle parameters 408 may include the mass, weight, size, wheel base, drive type, location of the center of gravity, weight/mass distribution, current occupancy, state of charge, access status (e.g., unrestricted access, disabled, metered access), axes of direction relative to the vehicle 10, etc. of the vehicle 10. In some embodiments, the vehicle parameters 408 may be predefined or located in the memory 104 of the vehicle 10.

Figure 6:
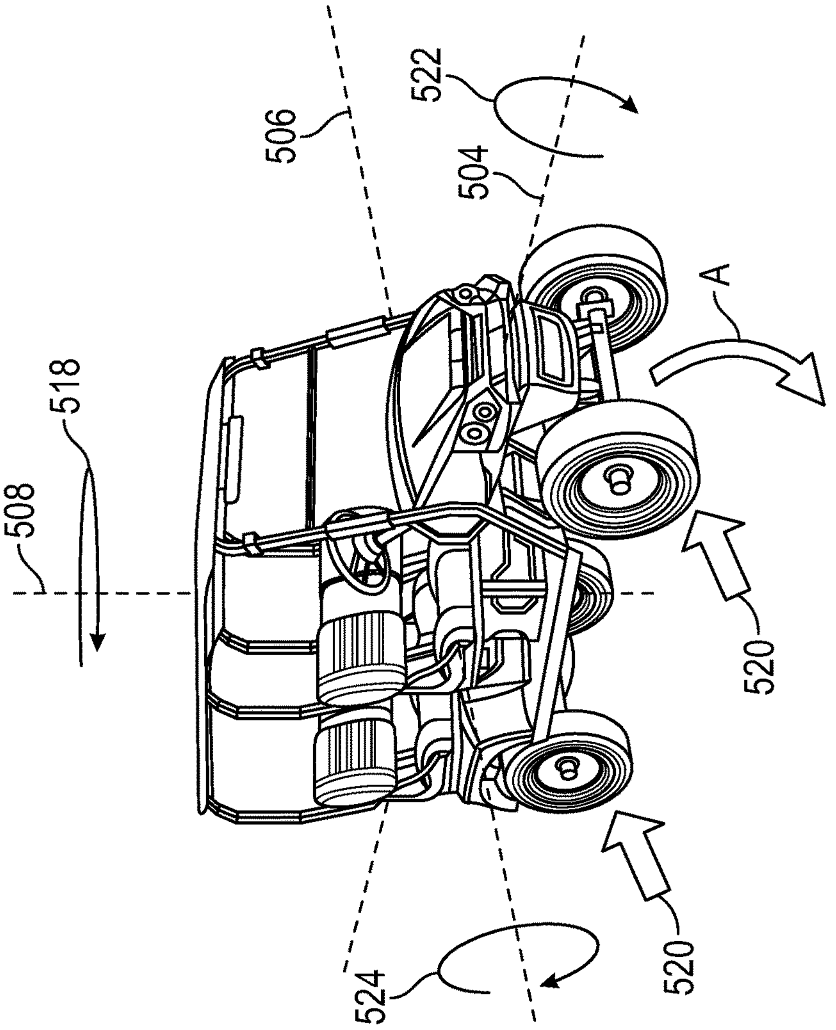
FIG. 6 is an illustration of a front-side view of a vehicle in a turning state, according to an exemplary embodiment.
Figure 5:
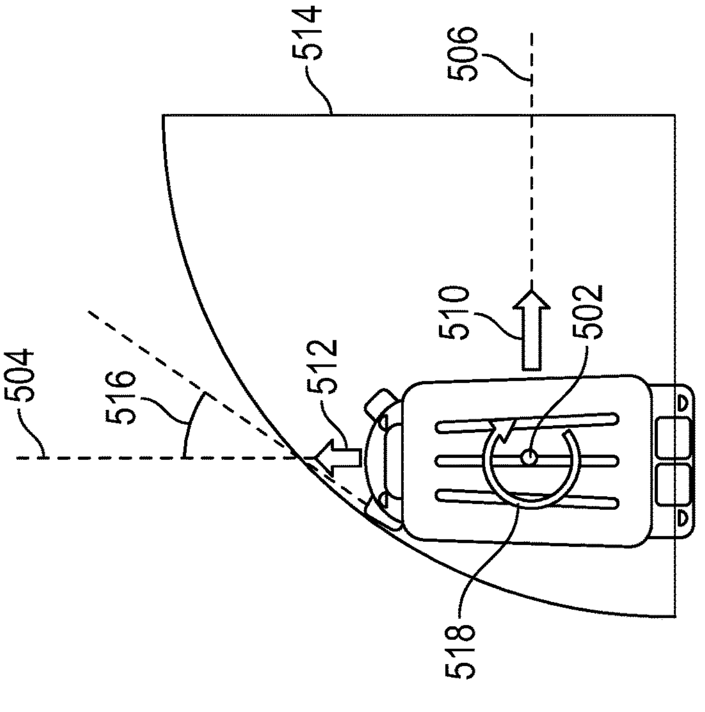
FIG. 5 is an illustration of an overhead view of a vehicle in a turning state, according to an exemplary embodiment.

Turning to FIGS. 5 and 6, exemplary vehicle motion data 406 and vehicle parameters 408 that may be utilized, detected, and/or calculated by the vehicle system 400 are shown, according to an exemplary embodiment. FIG. 5 shows an illustrative view from above of a vehicle 10 in an example turning state 402. FIG. 6 shows an illustrative front-side view of a vehicle 10 in another example turning state 402. The vehicle 10 includes vehicle parameters 408 such as a vehicle center of mass 502, an X-axis 504 (e.g., a forward/reverse axis, a longitudinal axis, etc.), a Y-axis 506 (e.g., a left/right axis, a lateral axis, etc.), and a Z-axis 508 (e.g., an upward/downward axis, a vertical axis, etc.). The X-axis 504, the Y-axis 506, and the Z-axis 508 provide a frame of reference to which the motion data 406 may be converted//translated to increase the efficiency, accuracy, and ease of tuning of the vehicle system 400, as discussed with respect to FIG. 7.

As the vehicle 10 travels, the vehicle motion data 406 may be detected, calculated, or otherwise determined by the one or more sensors 90 and/or the vehicle system 400. For example, in FIG. 5, the vehicle motion data 406 may include a linear velocity value (e.g., a horizontal linear velocity 510 and a forward linear velocity 512), a linear acceleration value (e.g., the degree of acceleration of the vehicle 10 in the orthogonal directions), a turn radius 514 of a path of the vehicle 10, a force value on the vehicle 10 (e.g., a centripetal force related to the turn radius 514, velocity, and mass of the vehicle 10), a turn angle 516, an angular velocity (e.g., an angular velocity 518 about the Z-axis 508), and/or an angular acceleration about one or more orthogonal axes of the vehicle 10. Turning to FIG. 6, the vehicle motion data 406 may include frictional forces 520 on the front tractive assembly 58 and the rear tractive assembly 56, X-axis angular velocity 522, Y-axis angular velocity 524, and the like as the vehicle 10 travels in the direction of arrow A. In some embodiments, the angular velocity 518 is indicative of the how rapidly the vehicle 10 is turning. In this way, the angular velocity 518 and/or the other vehicle motion data 406 may be used to determine a severity of a turn of the vehicle 10 or a likelihood that the vehicle 10 is entering or operating in the turning state 402.

Referring back to FIG. 4, the vehicle system 400 and/or processing circuitry thereof (e.g., the vehicle controller 100) may receive the vehicle motion data 406 and/or the vehicle parameters 408 from the one or more sensors 90 and/or the memory 104. Specifically, the vehicle controller 100 may translate/transform the signal data from the sensors 90 and determine values associated with the motion data 406 about the three orthogonal coordinate axes of the vehicle 10 for more intuitive processing. For example, a reading from a speedometer of the vehicle 10 may provide a speed value (e.g., 5 miles per second), while a compass, GPS, roll/pitch/yaw sensor, gyroscope, or the like may provide a direction/bearing of the vehicle 10 (e.g., indicating the vehicle 10 is veering to the left, etc.). The vehicle controller 100 may determine the relative linear and angular velocities along the orthogonal axes based on the data received from the sensors 90 (e.g., by splitting the velocity into its component parts in the X, Y, and Z directions, by receiving data from an onboard IMU, and the like).

In some embodiments, the memory 104 may be located on the vehicle controller 100 and receive vehicle parameters 408 from an external device, predefined vehicle parameters 408, etc. As the vehicle controller 100 monitors, receives, and/or otherwise analyzes the motion data 406 and/or the vehicle parameters 408, the vehicle system 400 (e.g., via the vehicle controller 100) may perform the example illustrated process for automatically operating a turn signal 49 of the vehicle 10. Specifically, the vehicle system 400 may perform step 410 and calculate a cornering or turn severity value and a cornering or turn time value associated the movement of the vehicle 10. As used herein, a turn severity value may include a score and/or metric based on one or more conditions indicative of the turning state 402. For example, an increase in the rate of change in a horizontal velocity, an increase in horizontal acceleration, an increase in angular velocity about the Z-axis 508, an increase in angular acceleration, and the like may be indicative of a high turn severity (e.g., relative to a predefined severity threshold, relative to a predefined absolute movement value such as 5 radians/second about the Z-axis, etc.), a non-zero turn severity relative to an internal scale of the vehicle controller 100, etc. Similarly, zero or no horizontal velocity, constant horizontal velocity, or varying angular velocities (e.g., indicative of slight swerving) may indicate a low turn severity compared to a predefined severity threshold or a predefined value designating a likely turn state 402. Accordingly, the vehicle system 400 may utilize an algorithm, heuristic, look-up table, or the like to determine the turn severity value based on the motion data 406 and relate the severity value to, e.g., the severity threshold. In this way, severity values below the severity threshold may indicate a low likelihood of a turn (e.g., the vehicle controller 100 determines to set the turn signal 49 to the off state) while severity values above the severity threshold may indicate a high likelihood of a turn (e.g., the vehicle controller 100 determines to set the turn signal 49 to the on state). Specifically, the vehicle controller 100 may determine an angular velocity about the Z-axis 508 and utilize the magnitude of the angular velocity about the Z-axis as the severity value.

The vehicle controller 100 may also determine the turn time value. The turn time value may include a duration of time associated with the motion data 406. For example, the turn time value may be the duration of an increase in the rate of change in a horizontal velocity, the duration of an increase in horizontal acceleration, a cumulative time that the vehicle experiences non-zero angular velocity about the Z-axis 508, an average time of an increase in angular acceleration, a ratio of time spent traveling in a straight line verses spent travelling in a curvilinear path, or the like. As explained below, time values and severity values may be considered or analyzed in light of severity thresholds and time thresholds in order to determine the likelihood of a turn state 402 or the likelihood of a non-turning state 404, the likelihood of an upcoming turn state 402, and/or the likelihood of an upcoming non-turning state 404.

After the vehicle system 400 and/or the vehicle controller 100 calculates the severity value(s) and the associated time value(s), the process may proceed to step 412. At step 412, the vehicle system 400 compares at least one of the severity values and/or the time values to at least one severity threshold and/or at least one time threshold. The severity threshold may provide a baseline or benchmark value to determine whether a severity value is likely to indicate a turning state 402 or a non-turning state 404. In some embodiments, the severity threshold may be a predefined minimum angular velocity value about the Z-axis 508. Accordingly, an angular velocity value below the severity threshold (e.g., a very slight curvature corresponding to the wheel rotated less than 5 degrees in either direction) will not result in the vehicle controller 100 determining that the vehicle 10 is in the turn state 402. Conversely, a high angular velocity about the Z-axis (e.g., the vehicle 10 making a U-turn at 10 mph) may exceed the severity threshold. In such an embodiment, the controller 100 may detect the increase in angular velocity and utilize a predefined increase in angular velocity over a period of time as the severity threshold.

The vehicle controller 100 may also apply a time threshold to determine whether a potential turn event is more or less likely to be indicative of the turn state 402 or the non-turning state 404. For example, the time threshold may be a minimum duration of the associated motion data 406 (e.g., at least 2 seconds, greater than 1 second, greater than a cumulative 4 seconds over a continuous 10 second window, etc.). In this way, the time threshold may indicate that otherwise high severity values are not indicative of the turn state 402. For example, the vehicle 10 may experience an angular velocity (severity value) above an angular velocity threshold (severity threshold), which may indicate that the vehicle 10 is in the turn state. However, the angular velocity (severity value) may only have a duration of 1 second (time value). The controller 100 may compare the time value of 1 second to a minimum time threshold (e.g., at least 2 seconds, at least 4 second within an 8 second period). In this scenario, because the time value is less than the minimum time threshold, the controller 100 may determine that the motion data 406 is not indicative of the turn state 402 (e.g., the vehicle 10 momentarily swerved before returning to its course in 1 second). In this way, the vehicle controller 100 may identify minor swerves, course-correcting turning maneuvers, or angular velocities caused by changes in the terrain from intentional cornering, turning events that require a signal, lane changes, etc.

After applying the severity threshold and/or the time threshold, the vehicle controller 100, at step 414, may determine, based on the motion data 406, that the vehicle 10 is operating in the turning state 402 or that the vehicle 10 is not operating in the turning state 402 (i.e., operating in the non-turning state 404). Additionally, the vehicle controller 100 may log or track severity values and/or time values and detect that the severity value is increasing or approaching the severity threshold. In this way, the vehicle controller 100 may anticipate, predict, or determine that the vehicle 10 is likely to operate in the turning state 402. Upon determining that the vehicle 10 is in the turn state 402 or likely to operate in the turn state 402 (e.g., the motion data 406 indicates that the vehicle is approaching the turn state 402), the vehicle controller 100 is configured to set a respective one of the turn signals 49 to the on state. Similarly, the vehicle controller 100 may determine, based on the motion data 406 or based on logged or tracked severity values and/or time values, that the severity value is decreasing or likely to cross from above the severity threshold to below the severity threshold. In this way, the vehicle controller 100 may anticipate/predict or determine that the vehicle 10 is likely to operate in the non-turning state 404. Upon determining that the vehicle 10 is in the non-turning state 404 or likely to operate in the non-turning state 404 (e.g., the motion data 406 indicates that the vehicle is exiting the turn state 402), the vehicle controller 100 is configured to set the respective one of the turn signals 49 to the off state.

Figure 7:
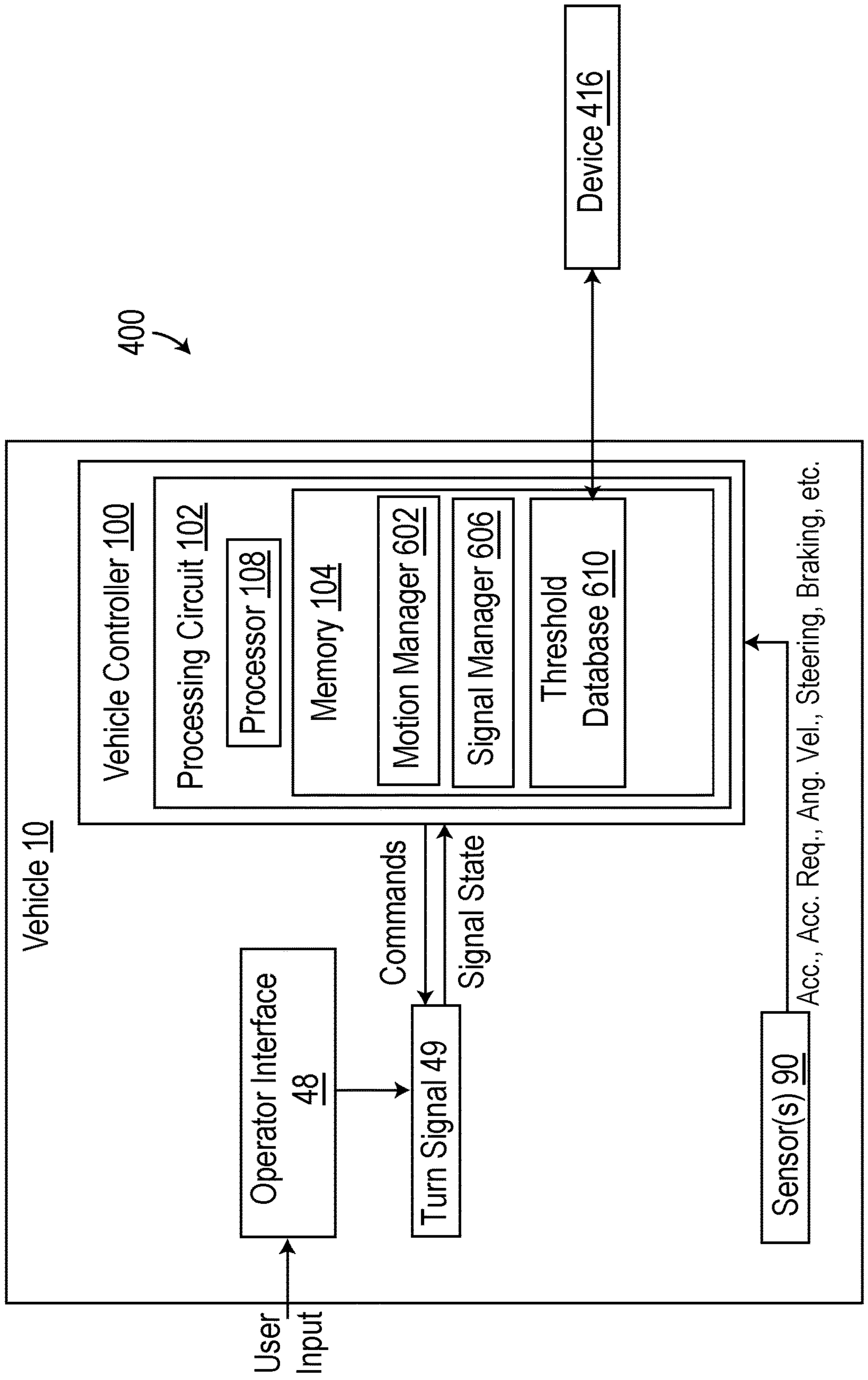
FIG. 7 is a block diagram of a vehicle system for automatically operating a turn signal of a vehicle, accordingly to an exemplary embodiment.

Turning to FIG. 7, a diagram illustrating an embodiment of the vehicle system 400 is shown. The vehicle system 400 includes the operator interface 48, at least one turn signal 49, at least one sensor 90, the vehicle controller 100, and an external device 416. Although shown as a component of the vehicle 10, various components or the entirety of the vehicle controller 100 and/or the processing circuit 102 thereof may be located on and/or remote from the vehicle 10. In some embodiments, the vehicle controller 100 and/or the processing circuit 102 may be integrated with another vehicle controller (e.g., a motor control unit ("MCU"), an engine control unit ("ECU"), etc.).

The operator interface 48 includes one or more of a lever, button, switch, or the like discussed above to manually activate/deactivate the turn signal 49. In some embodiments, the operator interface 48 may include a touch screen configured to display one or more user interfaces including buttons, textual indications, selectable icons, etc., in order to facilitate obtaining user inputs or commands, allow the user to toggle on/off the automatic turn signal functionality, provide the user with alerts regarding the vehicle system 400, etc.

The processing circuit 102 of the vehicle controller 100 may be implemented in a single controller or multiple distributed controllers throughout the vehicle 10. For example, any of the functions of the vehicle controller 100 as described herein can be performed by a fleet management system, the MCU, the ECU, a microcontroller or processor of the operator interface 48, local controllers or processing units of any components of the driveline 50 of the vehicle 10, the remote systems 240, etc., or any combination thereof.

The processing circuit 102 of the vehicle controller 100 includes a processor 108 and the memory 104. The memory 104 includes a motion manager 602, a signal manager 606, and a threshold database 610. The motion manager 602 is configured to receive the vehicle motion data 406 and determine that the vehicle 10 is operating in the turning state 402 or the non-turning state 404. For example, as discussed above, the motion manager 602 may calculate one or more severity values and/or time values based on the vehicle motion data 406 and compare the severity values and/or time values to a predefined metric (e.g., a predefined angular velocity indicative of the turn state for the respective vehicle 10) or the severity threshold and/or time thresholds. Accordingly, the motion manager 602 may communicate with and receive one or more thresholds from the threshold database 610. Upon determining that the vehicle 10 is in the turn state 402 or is approaching the turning state 402, the motion manager 602 is configured to communicate a signal indicative of the determination to the signal manager 606. Similarly, upon determining that the vehicle 10 is in the non-turning state 404 or is approaching the non-turning state 404, the motion manager 602 is likewise configured to communicate a signal indicative of the determination to the signal manager 606. In this way, the signal manager 606 may receive a current, periodic, etc. update regarding the state of motion of the vehicle 10. Additionally, the motion manager 602 may identify, track, or otherwise store a history of the movement states of the vehicle 10 (e.g., a duration of time that the vehicle 10 has been in a turning state 402, a duration of time the vehicle 10 has been at rest, etc.). Likewise, the motion manager 602 may communicate the duration of a movement state to the signal manager 606.

The signal manager 606 is configured to send commands to the turn signals 49 to cause the turn signals 49 to operate in the on state or the off state. For example, responsive to receiving an indication from the motion manager 602 that the vehicle 10 is operating in the turning state 402, the signal manager 606 may cause a respective one of the turn signal 49*s* to operate in an on state to indicate a turn in the detected direction. In contrast, responsive to receiving an indication from the motion manager 602 the vehicle 10 is not operating in the turning state and/or is operating in the non-turning state 404, the signal manager 606 may cause the respective turn signal 49 to operate in an off state.

The signal manager 606 may also be configured to monitor the position of the operator interface 48 and/or determine whether the operator is manually activating/deactivating the turn signals 49. For example, the signal manager 606 may receive one or more indications of a signal state from the turn signals 49. In some embodiments, the turn signals 49 send a signal to the signal manager 606 upon/during the on state. In other embodiments, the signal manager 606 may constantly, periodically, or the like monitor the turn signals 49 for an indication of the state of the operation of the turn signals 49. Accordingly, the signal manager 606 may receive indications of both the operator's manual command to the turn signals 49 and the automatic commands of the motion manager 602 to the turn signals 49. The signal manager 606 may thus be further configured to provide limited deference to an operator's manual command to the turn signals 49 (e.g., allow the operator to set the turn signal 49 to the on state despite the motion manager 602 determining that the vehicle 10 is in a non-turning state 404 and attempting to set the turn signal 49 to the off state).

In this way, the signal manager 606 may allow the operator to activate the turn signals 49 while the vehicle 10 is motionless, disabled, or the like. Further, the signal manager 606 may allow the operator to give advance notice of an intention to turn (e.g., allow the operator to signal a turn 10 second in advance of any turn and while heading in a straight route) in order to decrease the likelihood of hazardous driving and increase the chance that bystanders are aware of the operator's intent to turn. Accordingly, the signal manager 606 may be configured to receive an indication of the user input setting for the turn signals 49 to the on state, and despite receiving indications from the motion manager 602 to set the turn signals 49 to the off state, delay setting the turn signals 49 to the off state while the user input sets the turn signal to the on state.

In further embodiments, the signal manager 606 may be configured to override the user input from the operator interface 48 (e.g., to avoid excessive or accidental use of the turn signal 49 while a user is away from the vehicle 10). For example, the signal manager 606 may receive an override time (e.g., from the memory 104). The override time may designate a maximum length of time that the vehicle system 400 will allow the operator interface 48 to set the turn signals 49 to the on state while, at the same time, the motion manager 602 determines the turn signals 49 should be set to the off state. Example override times may include 1 minute, 2 minutes, 5 minutes, 10 minutes, 20 minutes, 3 hours, 5 hours, 10 hours, or other suitable limits. The signal manager 606 may, after the override time elapses, set the turn signals 49 to the off state despite the operator interface 48 setting the turn signal to the on state (e.g., the vehicle 10 is in a non-turning state 404 for an extended period of time despite the operator interface 48 keeping a respective one of the turn signals 49 in the on state). In some embodiments, the signal manager 606 may be configured to reset the operator interface 48 (e.g., flip the switch for the turn signals 49 back to an off position).

The threshold database 610 is configured to store one or more predefined thresholds (e.g., severity thresholds, time thresholds) used to evaluate and determine that the vehicle 10 is in/approaching the turning state 402 and/or the non-turning state 404. The threshold database 610 may also store combinations of thresholds (e.g., specific configurations of motion data 406) that designate turning maneuvers or conditions that result in a determination of the vehicle 10 being in the turning state 402. The threshold database 610 may provide fixed thresholds (e.g., a minimum angular velocity to designate a turn) or may provide varying thresholds to serve as reference points as a reference against which the current motion data 406 of the vehicle 10 can be compared. For example, the threshold database 610 may be configured to vary the severity threshold (e.g., minimum speed required to indicate a turn state 402) based on a change in temperature of the surroundings of the vehicle 10 received from sensors 90, a change in the weight of the vehicle 10, or the like. In some embodiments, the threshold database 610 may store specific angular velocities or lateral acceleration values that signify different levels of turning intensity, such as mild, moderate, or sharp turns.

The external device 416 can include a handheld device, a diagnostic device, a laptop, a PC, a tablet, a computer system, or another suitable device configured to communicate with the vehicle controller 100. The external device 416 may communicate, update, or otherwise provide vehicle parameters 408 to the memory 104. Additionally, the external device 416 may adjust, tune, add, remove, or otherwise modify thresholds within the threshold database 610. For example, the determination of the turn state 402 may be made more sensitive by lowering the angular velocity thresholds, severity thresholds, and time thresholds required to indicate the turn state 402.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle controller 100, the vehicle system 400, etc.), the site monitoring and control system 200 (e.g., the remote systems 240, the user portal 230, the user sensors 220, etc.), and the multi-level access control system 300 as shown in the various exemplary embodiments is illustrative only. Additionally, any element disclosed in one embodiment may be incorporated or utilized with any other embodiment disclosed herein.

The invention claimed is:

1. A golf cart comprising:
- a turn signal configured to indicate a turning state of the golf cart, the turn signal having an on state and an off state;
- a sensor configured to acquire motion data regarding motion of the golf cart; and
- a controller configured to:
  - acquire the motion data from the sensor;
  - determine a turn severity value based on the motion data;
  - compare the turn severity value to a severity threshold;
  - determine a turn time value corresponding with a duration associated with the turn severity value;
  - compare the turn time value with a time threshold;
  - determine whether the golf cart is operating in a turning state based on the turn severity value relative to the severity threshold and the turn time value relative to the time threshold;
  - set the turn signal to the on state in response to determining that the golf cart is operating in the turning state; and
  - set the turn signal to the off state in response to determining that the golf cart stops operating in the turning state and is operating in a non-turning state.

2. The golf cart of claim 1, wherein the motion data includes an angular velocity of the golf cart, and wherein the controller is configured to:
- determine the turn severity value based on the angular velocity; and
- determine that the golf cart is in the non-turning state while the turn severity value is below the severity threshold.

3. The golf cart of claim 1, wherein the controller is configured to
- determine that the golf cart is not in the turning state while the turn time value is less than the time threshold.

4. The golf cart of claim 1, further comprising an operator interface configured to facilitate manually setting the turn signal to the on state or the off state, wherein the controller is configured to:
- receive a user input from the operator interface; and
- set the turn signal to the on state in response to determining that the golf cart is not operating in the turning state and determining that the user input sets the turn signal to the on state.

5. The golf cart of claim 4, wherein the controller is configured to set the turn signal to the off state after an override time elapses in response to determining that the golf cart is not operating in the turning state and determining that the user input sets the turn signal to the on state.

6. The golf cart of claim 1, wherein the sensor includes an inertial measurement unit.

7. The golf cart of claim 1, wherein the motion data includes at least one of a linear velocity value, an acceleration value, a force on the golf cart, a turn radius, a turn angle, an angular acceleration, or an angular velocity about one or more orthogonal axes of the golf cart.

8. A vehicle system for a vehicle having a turn signal, the vehicle system including:
- one or more processing circuits configured to:
  - receive motion data associated with the vehicle;
  - determine a turn severity value based on the motion data;
  - compare the turn severity value to a severity threshold;
  - determine a turn time value corresponding with a duration associated with the turn severity value;
  - compare the turn time value with a time threshold;
  - determine whether the vehicle is operating in a turning state based on the turn severity value exceeding the severity threshold for at least the time threshold;
  - set the turn signal to an on state in response to determining that the vehicle is operating in the turning state; and
  - set the turn signal to an off state in response to determining that the vehicle stops operating in the turning state and is operating in a non-turning state.

9. The vehicle system of claim 8, wherein the vehicle is a golf cart, an all-terrain vehicle, a utility task vehicle, or a lightweight or recreational vehicle.

10. The vehicle system of claim 8, wherein the one or more processing circuits include at least one of (a) a first processing circuit configured to be located on the vehicle or (b) a second processing circuit configured to be located remote from the vehicle.

11. The vehicle system of claim 8, wherein the motion data includes an angular velocity of the vehicle, and wherein the one or more processing circuits are configured to:
- determine the turn severity value based on the angular velocity; and
- determine that the vehicle is in the non-turning state while the turn time value is below the time threshold.

12. The vehicle system of claim 11, wherein the one or more processing circuits are configured to
- determine that the vehicle is not in the turning state while the turn time value is less than the time threshold.

13. The vehicle system of claim 8, wherein the one or more processing circuits are configured to:
- receive a user input from an operator interface of the vehicle configured to facilitate manually setting the turn signal to the on state or the off state; and set the turn signal to the on state in response to determining that the vehicle is not operating in the turning state and determining that the user input sets the turn signal to the on state.

14. The vehicle system of claim 13, wherein the one or more processing circuits are configured to set the turn signal to the off state after an override time elapses in response to determining that the vehicle is not operating in the turning state and determining that the user input sets the turn signal to the on state.

15. A method for automatically operating a turn signal of a vehicle, the method comprising:

receiving, by a control system, motion data associated with the vehicle, the motion data including an angular velocity of the vehicle;

determining, by the control system, a turn severity value based on the angular velocity;

comparing, by the control system, the turn severity value to a severity threshold;

determining, by the control system, a turn time value corresponding with a duration associated with the turn severity value; comparing the turn time value with a time threshold;

determining, by the control system, whether the vehicle is operating in a turning state based on the turn severity value exceeding the severity threshold for at least the time threshold;

setting, by the control system, the turn signal to an on state in response to determining that the vehicle is operating in the turning state; and setting, by the control system, the turn signal to an off state in response to determining that the vehicle stops operating in the turning state and is operating in a non-turning state.

16. The method of claim 15, further comprising determining, by the control system, that the vehicle is in the non-turning state while the turn time value is below the time threshold.

17. The method of claim 16, further comprising determining, by the control system, that the vehicle is not in the turning state while the turn time value is less than the time threshold.

18. The method of claim 15, further comprising:

receiving a user input from an operator interface of the vehicle configured to facilitate manually setting the turn signal to the on state or the off state; and setting the turn signal to the on state in response to determining that the vehicle is not operating in the turning state and determining that the user input sets the turn signal to the on state.

19. The method of claim 18, further comprising setting, by the control system, the turn signal to the off state after an override time elapses in response to determining that the vehicle is not operating in the turning state and determining that the user input sets the turn signal to the on state.

20. The method of claim 15, wherein the vehicle is a golf cart, an all-terrain vehicle, a utility task vehicle, or a lightweight or recreational vehicle.

* * * * *